April 19, 1955  S. H. M. DODINGTON  2,706,773
PULSE REPEATERS

Filed March 26, 1943  3 Sheets-Sheet 1

INVENTOR.
SVEN H. M. DODINGTON
BY
ATTORNEY

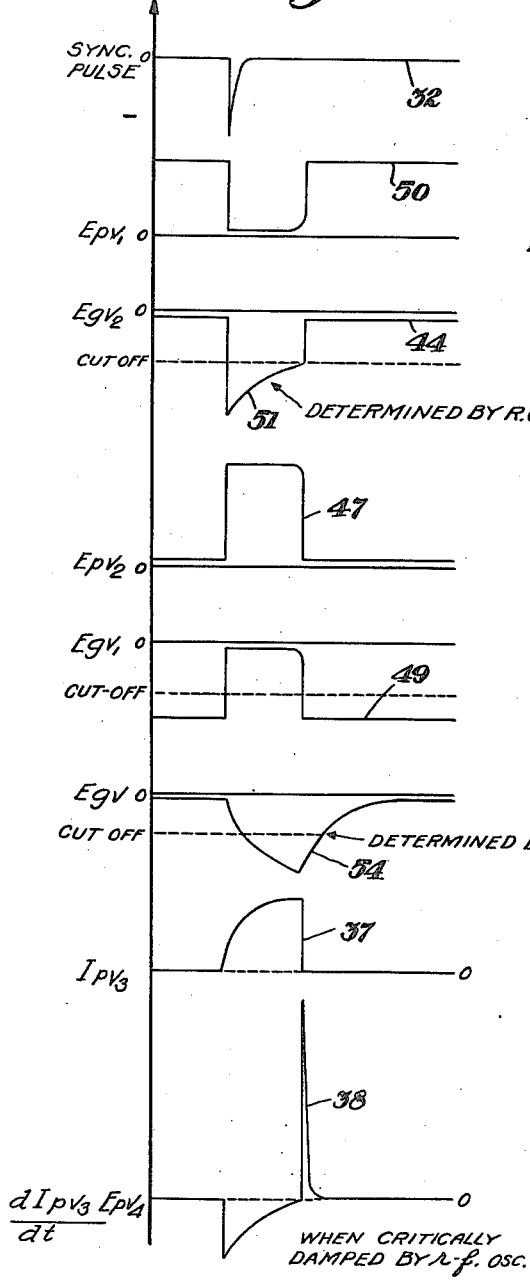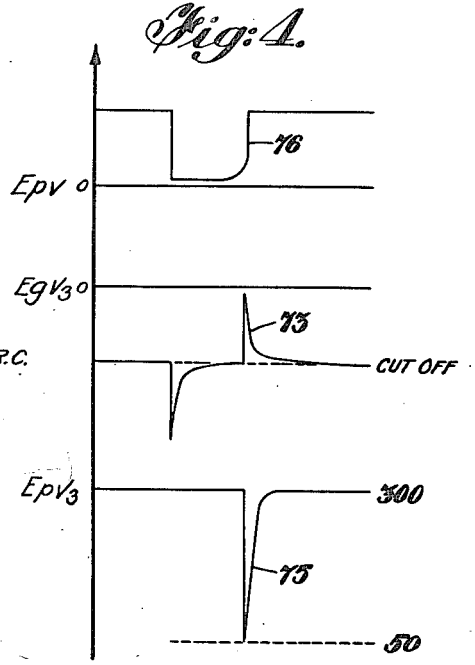

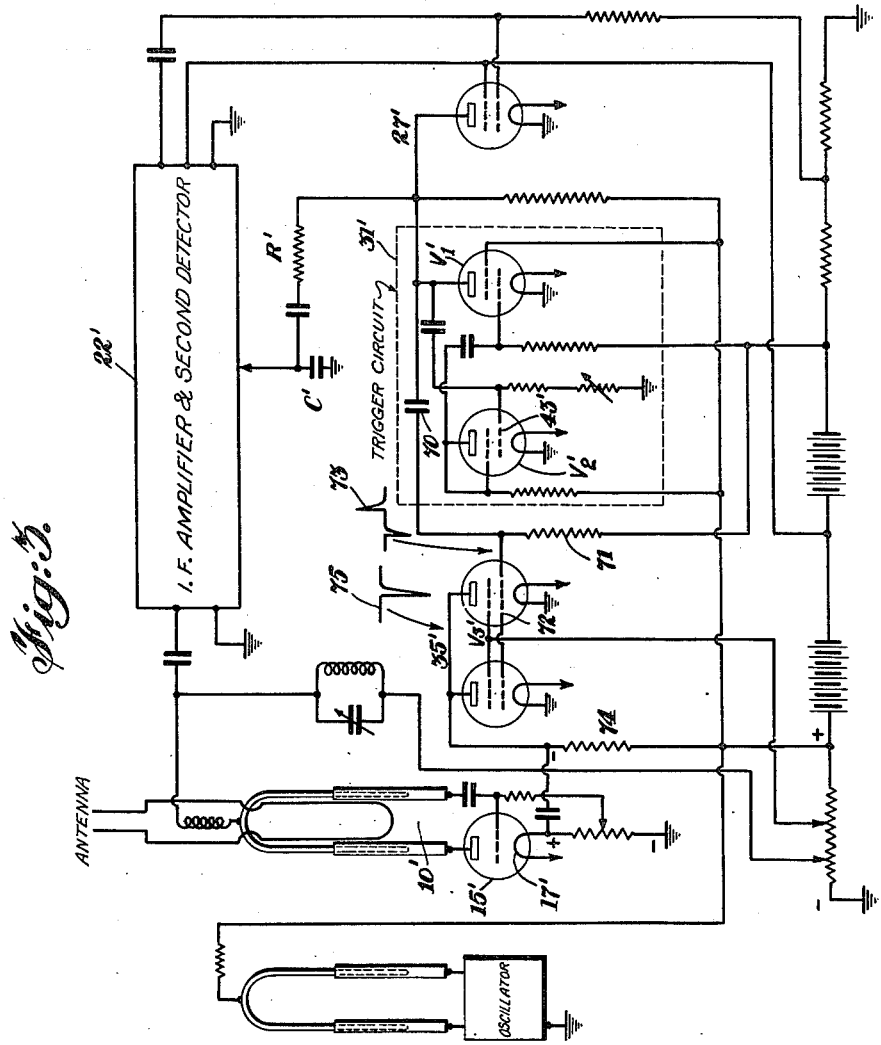

United States Patent Office 2,706,773
Patented Apr. 19, 1955

2,706,773

PULSE REPEATERS

Sven H. M. Dodington, Forest Hills, N. Y., assignor to International Telephone and Telegraph Corporation, a corporation of Maryland Application March 26, 1943, Serial No. 480,603

10 Claims. (Cl. 250—15)

This invention relates to radio pulse repeaters and in particular to pulse repeaters of the type wherein the repeated or transmitted pulse follows the reception of the pulse which is to be repeated by a predetermined time period. More specifically the invention relates to a circuit arrangement for intercepting a transmitted pulse by and for transmitting a repeated pulse from a single antenna system.

The invention may be considered as an improvement on the pulse repeating system disclosed in a copending application of E. M. Deloraine and H. G. Busignies, Serial No. 436,846, filed March 30, 1942.

One of the objects of my invention is to provide a pulse repeater wherein the antenna system employed for receiving a pulse and for transmitting a repeated pulse is one and the same.

Another object of my invention is to provide a circuit arrangement whereby a single electronic vacuum tube and its associated circuits function as a frequency converter for received pulses and as an oscillator for transmitting repeated pulses.

Another object of my invention is to provide an arrangement for a repeater system whereby a predetermined and adjustable time interval is interposed between the time a pulse is received and the time a repeated pulse is transmitted.

A further object of my invention is to provide means for disabling or reducing the gain of certain amplifier elements of a receiving equipment during the period that a pulse is being transmitted.

The above and other objects and features of my invention will become more apparent upon consideration of the following detailed description to be read in connection with the accompanying drawings in which:

Fig. 2 is a set of curves to be used in describing the operation in the circuit illustrated in Fig. 1;

Fig. 3 is a schematic circuit diagram illustrating a second embodiment of my invention and Fig. 4 is a second set of curves to be used in describing the operation of the circuit illustrated in Fig. 3.

Figure 1:
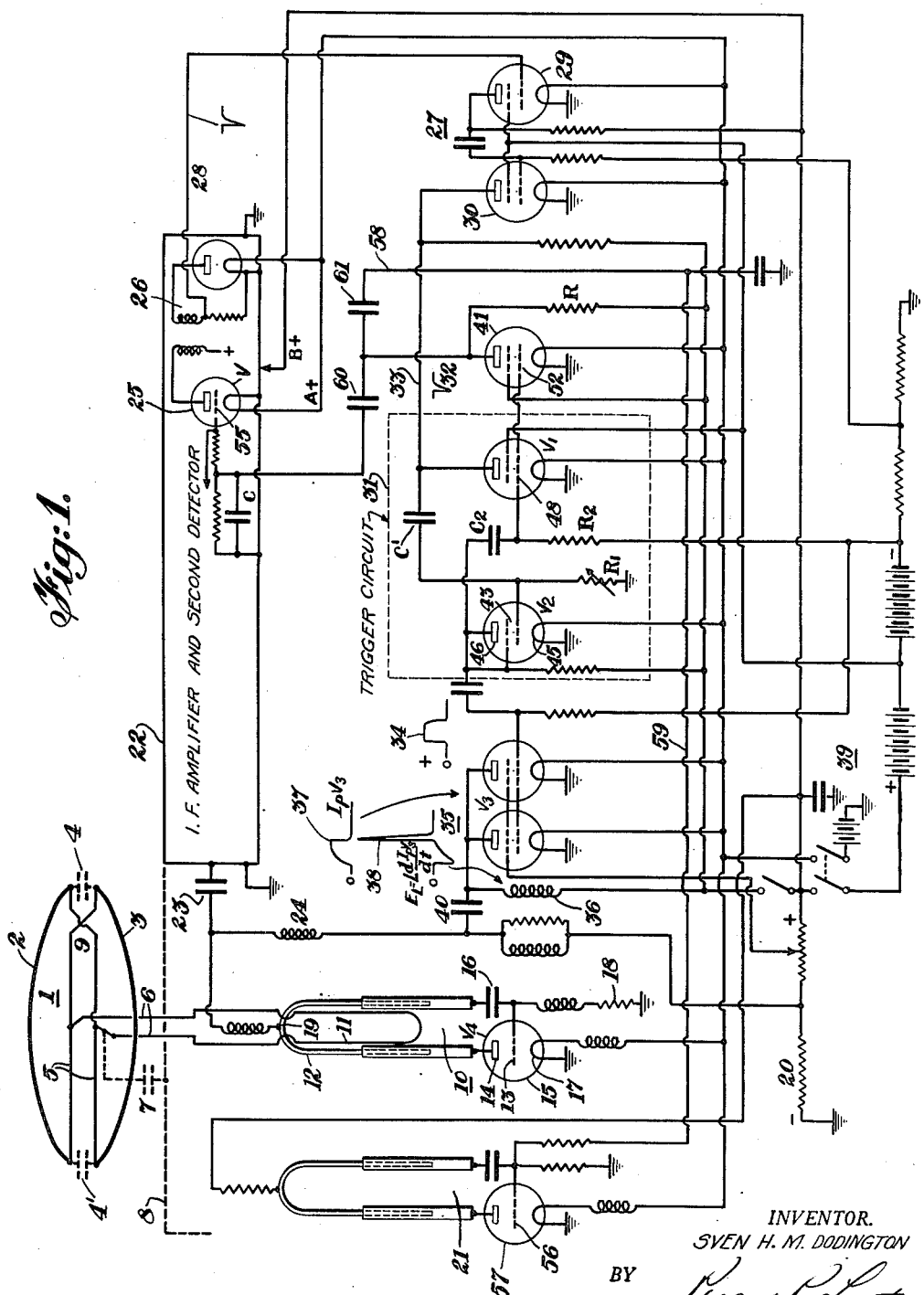
Fig. 1 is a schematic circuit diagram illustrating one of the embodiments of my invention.

My invention as a whole relates to a means for deceiving an enemy equipped with apparatus for locating either ships or aircraft which may be otherwise invisible to him due either to being beyond his range of vision or to unfavorable weather conditions such as fog, clouds, etc. It may be assumed that the enemy possesses means for transmitting short pulses of radio frequency energy and also means for receiving the reflected pulses from a large object such as, for example, a battleship. His equipment would include a means for determining the time interval between the time he transmitted a pulse and the time the reflected pulse was received, and also a means for determining the direction of the received pulse. Knowing the speed of propogation of radio waves, he would be able to determine the distance between his transmitter and the object which reflected the transmitted pulse.

In accordance with my invention, I provide a pulse repeater system which may be attached to a small balloon, the balloon and its equipment being released from the object which it is desired to protect. The balloon in itself would in all probability be not only constructed of non-reflecting material, but would also be so small that any wave reflected therefrom would not possess sufficient energy to produce a reading on the enemy's receiving equipment. However, attached to the balloon is the apparatus embodying my invention which is designed to simulate a reflected wave pulse, not at the point where the balloon may be but at a more distant point.

Referring first to Fig. 1 the element 1 represents an antenna designed primarily for the reception and transmission of horizontally polarized waves. The antenna comprises two radiating members 2 and 3 which are fed at their extremities through transmission lines 5 and 6. The cross-over 9 is employed in transmission line 5 to produce proper phase relations at the extremities of the elements 2 and 3. The proximity of the ends of elements 2 and 3 to each other results in there being inherent capacitance 4 and 4' between the adjacent ends. This type of antenna radiates waves which are polarized in the plane of the antenna and if the antenna is positioned horizontally, as it normally would be, the radiated waves are horizontally polarized. Similarly such an antenna will receive only waves which are horizontally polarized. Since the polarization of the waves making up the pulse transmitted by the enemy is unknown, it is necessary that means be provided for receiving waves which may be both horizontally and/or vertically polarized. This is accomplished as follows:

The apparatus of my invention is enclosed in a casing or housing represented by the dotted line 8. This casing is made approximately ¼ wave length long at the frequency at which the apparatus is designed to operate. The cross section of the housing is made as small as possible consistent with the size of the apparatus enclosed therein. This housing or casing 8 is positioned substantially at right angles to the plane of the antenna 1. The housing is adapted to either receive or transmit vertically polarized waves coupling it assymetrically to the antenna 1. This assymetric coupling is represented in Fig. 1 by the capacitor 7.

The antenna 1 is coupled to a frequency converter 10 through the inductive coupling between the loop 11 and the oscillating circuit 12 of the converter. The circuit 12 is of the Lecher frame type, the ends of the frame being connected to the grid 13 and the anode 14 of the electron tube 15. A blocking condenser 16 isolates the radio frequency voltages from the direct current voltages of the power supply. Element 17 is an electron emissive cathode and 18 is a grid leak resistor. A direct current voltage obtained from the drop across resistor 20 is applied to the anode 14 at the point 19 on the Lecher frame. This voltage is normally low being of the order of 70 volts and is so chosen that the converter 10 will operate satisfactorily as a first detector and yet will not spill over into oscillations.

A heterodyne oscillator 21 having in general the same circuit characteristics as the frequency converter 10 is so positioned that it will introduce a voltage into the circuit 10. The coupling between the converter 10 and the heterodyne oscillator 21 may be either inductive, capacitive or any other suitable type. The frequency of the oscillator is so adjusted that it is slightly different from that of the received carrier wave frequency. The frequency adjustment of both the oscillator and the frequency converter circuits may be made by constructing the Lecher frames so that their lengths may be varied in trombone fashion. The difference or beat frequency is detected in the frequency converter 10 and the energy at this new or intermediate frequency energizes an intermediate frequency amplifier shown as a block 22. Capacitor 23 is employed as a coupling means between the frequency converter and the intermediate frequency amplifier while the choke coil 24 prevents the intermediate frequency energy from passing into other parts of the circuit.

The intermediate frequency amplifier is of more or less standard construction and will not be described in detail since its particular design forms no part of my invention. It is designed to pass a band of frequencies in order that it will efficiently amplify even though there may be slight variations in frequency of either the carrier wave or the heterodyne oscillator. One of the stages 25 of the amplifier is shown within the block diagram and will be discussed later. The detector or rectifier 26, also shown within the block diagram 22, is for converting the intermediate frequency energy to a direct current pulse. The output from the rectifier 26 is connected over lead 28 to the input of a pulse amplifier 27. In passing, it will be noted that the pulse is of negative polarity in the particular circuit arrangement shown.

The pulse amplifier 27 comprises two tubes 29 and 30. These tubes are shown as tetrodes but any other suitable amplifier tube could be employed. A negative pulse arriving on the grid of tube 29 produces a positive pulse in the plate circuit of this tube. This positive pulse is in turn applied to the grid of the tube 30 and produces a negative pulse on the plate of the latter tube in accordance with the fact that a phase change of 180° occurs in passing through the tube.

The negative pulse in the output circuit of amplifier tube 30 energizes a trigger circuit shown within the dotted block 31. This trigger circuit is employed to change the wave shape of the negative pulse shown schematically at 32 adjacent to the lead 33 to a form shown by curve 34 representing the output of the trigger circuit. The operation of the trigger circuit 31 will be explained hereinafter in connection with the curves shown in Fig. 2.

The modulator 35 is illustrated as a plurality of tubes connected in parallel. The output circuit of the modulator comprises a coil 36 of high impedance and is for the purpose of producing a voltage having a wave shape which is the differential of the curve representing the current in the plate circuit. This latter curve is represented at 37 and the differential voltage curve at 38. The negative portion of the curve 38 represents the voltage drop across the impedance 36 during the time that the tubes of the modulator 35 are drawing current. When the potential on the grids of the modulator tubes falls to cut-off in accordance with the curve 34, the flux which has been built up in the impedance 36 collapses inducing the high peaked positive pulse shown on curve 38. This positive pulse is impressed over the capacitor 40 to the anode 14 and causes the converter to swing into oscillation. Suitable power and voltage sources for the cathodes, grids and anodes of the tubes of the various circuits are shown schematically at 39 and are believed to require no detailed explanation.

The oscillations are in the form of a pulse having substantially the same wave shape as the original received pulse, but of course, of much greater amplitude. The energy from this pulse is transmitted to the antenna 1 through the coupling 11 and the transmission line 6. Some of this energy is coupled to the ¼ wave length casing 8 as hereinbefore described.

If preventive means were not taken, energy from the transmitted pulse would combine with energy from the heterodyne oscillator to again produce an intermediate frequency as above described, and would in turn be passed on to the intermediate frequency amplifier with the result that the whole circuit would sing at a frequency determined by the delay time of the complete circuit. To prevent such an occurrence, means are provided whereby at least one and preferably two of the tubes of the intermediate frequency amplifier are blocked so that the gain of the whole amplifier becomes substantially zero. This blocking means comprising a tube 41 and its associated circuits. The operation of this tube and that of the trigger circuit 31 will now be described in connection with Fig. 2 of the drawing.

Fig. 2 illustrates the wave form of various voltages and currents as they appear on the same time base in the circuits of the trigger circuit 31 and the blocking tube 41. Curve 32 represents the negative pulse as it appears in the output circuit of the amplifier tube 30. This pulse is impressed on the series circuit consisting of capacitor $C_1$ and the resistor $R_1$. At the junction point of $C_1$ and $R_1$, the control grid 43 of vacuum tube $V_2$ is connected. The voltage on the grid of this tube is shown by the curve 44. Normally there is zero, or at least only a very small bias on the grid 43 since this grid is connected to the cathode 45 through the resistor $R_1$ and any voltage which may be developed on the grid is due only to the small amount of electron current which might flow to the grid.

When the grid 43 goes negative the voltage appearing on the plate 46 rises rapidly as shown by the curve 47 in Fig. 2. This rapid rise in voltage is passed on to the grid 48 of tube $V_1$. This grid 48 is normally biased considerably below cut-off as shown by curve 49. When the grid 48 becomes less negative and rises above cut-off the plate voltage of tube $V_1$ drops almost to zero as shown by the curve 50 and the tube $V_1$ substantially short-circuits the series combination of capacitor $C_1$ and resistor $R_1$ causing the discharge of the capacitor through the resistor. This rate of discharge is determined by the relative values of the capacitance and resistance of this circuit as shown by the curve 51 in Fig. 2. The resistance of $R_1$ is made variable to control the time delay period before the voltage on the grid 43 reaches cut-off. When this voltage reaches a cut-off value, the plate current of tube $V_2$ increases rapidly thereby causing its plate voltage to drop. Practically simultaneously with this action, the grid 48 of tube $V_1$ drops to its original value which is substantially below cut-off, and the cycle is complete. It will be seen that elapsed time, represented for example by the vertical portions of the curve 47, is controlled by the time constant of the series circuit $R_1$ and $C_1$. This time interval represents substantially the time between the reception of an incoming pulse and the time that the repeated pulse is transmitted. This time may be, of course, modified by other slight delays in the circuits as a whole, but these latter delays are usually of minor importance.

Let us now go back and imagine what the enemy perceives on his receiver indicating equipment. His transmitted pulse instead of being reflected immediately when it strikes antenna 1, is delayed a few microseconds before it is retransmitted back to him. This fact produces the elusion that the object which reflects the retransmitted pulse is at a greater distance from his equipment than it actually is. A more complete discussion of this particular use of my invention may be had by referring to the copending application of E. M. Deloraine and H. G. Busignies above referred to.

Continuing now with a discussion of the action of blocking tube 41, it will be observed that the grid 52 of this tube is energized simultaneously with the grid 48 of the tube $V_1$. The positive voltage which is impressed upon this grid 52 results in a decrease in voltage on the plate of the tube 41 due to the drop through the resistor R. This drop does not occur instantaneously due to the fact that it takes an appreciable time to charge capacitor C, this capacitor being shown in the input circuit of the tube V within the block 22. The charging and discharging of capacitor C is represented by the curve 54 of Fig. 2. It will be seen from this curve that the voltage on the grid 55 of tube V which is connected to capacitor C has been reduced below cut-off for that portion of the cycle during which the frequency converter 10 is oscillating and transmitting a pulse from the antenna 1. Curves 37 and 38 have been included in Fig. 2 to more accurately illustrate this condition.

Fig. 1 also shows circuit connections whereby the voltage employed to block the tube V is also applied to the grid 56 of the tube 57 in the heterodyne oscillator circuit, this voltage being impressed over the leads 58 and 59. Capacitors 60 and 61 have relatively large capacitance and function merely as blocking capacitors.

Referring now to Fig. 3, I have illustrated therein another embodiment of my invention. The circuits of Fig. 3 operate in general on the same principles employed in the circuits of Fig. 1, the main difference being in the manner in which the high voltage impulse is impressed upon the frequency converter tube for producing the transmitted pulse. In Fig. 3, this high voltage is impressed on the cathode rather than on the anode electrode as illustrated in Fig. 1. Actually, of course, the voltage impulse impressed on the cathode must be negative, and suitable circuit modifications must be made in order to provide for this necessity. In general the circuits of Figs. 1 and 3 are quite similar and I will only point out in particular the differences which are believed necessary to the adequate understanding of my invention.

The antenna unit, the heterodyne oscillator, the intermediate frequency amplifier, etc. may be substantially the same as those shown in Fig. 1. The frequency converter 10' is similar to the frequency converter 10 in Fig. 1, the only difference being that provision is made for impulsing the cathode instead of the anode as explained above.

The circuits of the second detector which is within the block 22', representing the intermediate frequency amplifier and the second detector, are so organized that a positive pulse is impressed upon the grid of the pulse amplifier 27'. The negative pulse appearing on the plate of the amplifier 27', is impressed on the grid 43' of tube V₂', the latter being one of the tubes of the trigger circuit enclosed within the dotted block 31'. The action of the trigger circuit 31' is identical to that of trigger circuit 31 described above. The voltage for impulsing the grids 72 of the modulator tubes V₃' is taken from the output of V₁' instead of from V₂ as in Fig. 1. This voltage is impressed on the grids 72 through a capacitor 70 and a resistor 71, this capacitor and resistor combination acting as a differentiating circuit. The voltage has a wave form shown by the curve 73 of Figs. 3 or 4.

The negative pulse shown on the curve 73 has no effect on the modulator since it merely drives the grids 72 more negative than they originally were. On the other hand the positive pulse causes a pulse of current to flow in the output circuit of the modulator through the resistor 74. The voltage across this resistor which is the same as the voltage appearing on the plates of the modulator has the wave form shown by the curve 75 of Fig. 4. It will be seen that this pulse is negative as required.

This negative pulse is applied to the cathode 17' of the frequency converter 15' thereby making the cathode more negative with respect to the plate. This increased voltage causes the frequency converter 10' to generate a pulse at the frequency to which it is tuned, namely that of the incoming or received pulse. This generated pulse is transmitted to the antenna in the same manner as described in connection with Fig. 1.

In Fig. 3 the voltage for reducing the gain of the intermediate frequency amplifier to a value such that the amplifier has substantially zero gain, is taken from the output of the tube V₁'. This voltage has the wave form shown by curve 76 of Fig. 4. The voltage is integrated by the series circuit R'C' and the integrated voltage has substantially the same wave form as that shown by the curve 54 of Fig. 2. The voltage is applied to one or more of the grids of the amplifier tubes within the block 22'.

The circuits of Figs. 1 and 3 each possess features which tend to accent certain desirable operating characteristics. For example: By employing a collapsing flux resulting from the fall of current in the impedance 36 shown in the output circuit of the modulator 35 of Fig. 1, a voltage pulse is obtainable which is considerably larger than the voltage of the power supply. This high voltage results in a greater energy output in the repeat pulse. However, since it takes appreciable time to store energy within the impedance 36, this circuit arrangement does not permit very short delay intervals between the reception of a pulse and the transmission of a repeated pulse. The longer the delay period desired, the greater is the time for storing energy, and therefore the greater the voltage pulses which may be applied to the frequency converter circuit. If short delay periods are required, it is necessary to reduce the impedance of the coil 36 and this in turn reduces the voltage which may be induced by the collapsing flux.

In Fig. 3 the resistor 74 in the output circuit of the modulator 35' does not store energy and therefore the voltage drop thereacross occurs simultaneously with the current flowing. The circuit arrangement permits very short delay periods to be obtained, but on the other hand, the voltage applied to the frequency converter is limited by the voltages of the power source. Each of the circuit arrangements shown in Figs. 1 and 2 has its own fields of usefulness depending upon delay periods and the required amount of power in the retransmitted pulse.

While I have described above the principles of my invention in connection with specific apparatus, and particular modifications thereof, it is to be clearly understood that this description is made only by way of example and not as a limitation of the scope of the invention as set forth in the objects of my invention and the accompanying claims.

I claim:

1. A pulse receiving and repeating system comprising an antenna for receiving a pulse having a given carrier frequency, frequency converter means connected to said antenna for converting the frequency of the received pulse to a pulse of lower frequency, said converter means including a vacuum tube having cathode, grid, and anode electrodes, a power source connected between said cathode and anode electrodes, the voltage of said source having a value insufficient to develop sustained oscillations in said converter means, means for amplifying and rectifying the pulse of lower frequency to produce a rectified pulse, a trigger circuit for developing an output voltage under control of said rectified pulse, a modulator having an output circuit and an input circuit, means in said output circuit for developing a voltage when said input circuit is energized by said trigger circuit output voltage, and means for applying said modulator output voltage to said converter means, the value of said modulator output voltage being sufficient to develop oscillations in said converter means whereby a pulse is transmitted from said antenna.

2. A pulse receiving and repeating system in accordance with claim 1, in combination with means for reducing the gain of the means for amplifying said pulse of lower frequency during periods when said converter means is developing oscillations whereby the transmitted pulse is prevented from reacting on the trigger circuit.

3. A pulse receiving and repeating system in accordance with claim 1, wherein said trigger circuit includes a time delay circuit for controlling the time interval between the time that the carrier frequency pulse is received and the time that the converter means develops oscillations.

4. A pulse receiving and repeating system in accordance with claim 1, wherein the means for developing a voltage in said output circuit includes an inductive impedance whereby the developed voltage is proportional to the first derivative of the current flowing in said output circuit.

5. A pulse receiving and repeating system in accordance with claim 1, wherein the means for developing a voltage in said output circuit includes an ohmic resistance whereby the developed voltage is directly proportional to the current flowing in said output circuit, and means for applying said voltage to the cathode of said converter means.

6. A pulse receiving and repeating system comprising an antenna for receiving a pulse having a given carrier frequency, frequency converter means connected to said antenna for converting the frequency of the received pulse to a pulse of lower frequency, said converter means including a vacuum tube having cathode, grid, and anode electrodes, a power source connected between said cathode and anode electrodes, the voltage of said source having a value insufficient to develop sustained oscillations in said converter means, means for amplifying and rectifying the pulse of lower frequency to produce a rectified pulse, a trigger circuit for developing an output voltage under control of said rectified pulse, a modulator having an output circuit and an input circuit, means in said output circuit for developing a voltage when said input circuit is energized by said trigger circuit output voltage, means for applying said modulator output voltage to said converter means, the value of said modulator output voltage being sufficient to develop oscillations in said converter means whereby a pulse is transmitted from said antenna, and means for reducing the gain of the means for amplifying said pulse of lower frequency during periods when said frequency converter is developing oscillations, said gain reducing means comprising a thermionic tube having input and output circuits, said tube input circuit being connected to said trigger circuit and controlled thereby, said tube output circuit including a time delay circuit, said delay circuit being connected to said means for amplifying said pulse of lower frequency.

7. A pulse receiving and repeating system in accordance with claim 1 and including an integrating circuit, said integrating circuit being connected between said trigger circuit and said means for amplifying said pulse of lower frequency whereby the transmitted pulse is prevented from reacting on said trigger circuit during periods when said converter means is developing oscillations.

8. A pulse receiving and repeating system comprising an antenna for receiving a pulse having a given carrier frequency, frequency converter means connected to said antenna for converting the frequency of the received pulse to a pulse of lower frequency, a power source coupled to said converter means, the voltage of said source having a value insufficient to develop sustained oscillations in said converter means, means for rectifying the pulse of lower frequency to produce a rectified pulse, a circuit for developing an output voltage under control of said rectified pulse, a modulator, means for coupling said circuit to said modulator, means in said modulator developing a voltage under control of said rectified pulse, and means for applying said modulator output voltage to said converter means, the value of said modulator output voltage being sufficient to develop oscillations in said converter means whereby a pulse is transmitted from said antenna.

9. A repeater for receiving and retransmitting pulses at a given carrier frequency, comprising an antenna, a frequency converter means coupled to said antenna, said converter means comprising a vacuum tube, a converter circuit tuned to said carrier frequency coupled to said tube, means for supplying an operating voltage to said tube and a beat frequency oscillator coupled to said circuit, said operating voltage being of insufficient value to sustain oscillation in said converter circuit, whereby pulses received on said antenna are converted to pulses of a lower frequency, means responsive to said received converted pulses for producing a high voltage pulse, said high voltage pulse being of sufficiently high voltage to sustain oscillations in said converter circuit, and means for applying said high voltage pulse to said converter circuit, whereby a pulse corresponding to the received pulse is transmitted from said antenna.

10. A pulse receiving and repeating system comprising an antenna for receiving a pulse having a given carrier frequency, frequency converter means comprising an oscillatable circuit tuned to said carrier frequency and a beat frequency oscillator connected to said antenna for converting the frequency of the received pulse to a pulse of lower frequency, a power source coupled to said circuit, the voltage of said source having a value insufficient to develop sustained oscillations in said circuit, means responsive to said received converted pulse for producing a high voltage pulse, said high voltage pulse being of sufficiently high voltage to sustain oscillations in said circuit, and means for applying said high voltage pulse to said circuit, whereby a pulse corresponding to the received pulse is transmitted from said antenna.

References Cited in the file of this patent

UNITED STATES PATENTS

| | | |
|---|---|---|
| 2,134,716 | Gunn | Nov. 1, 1938 |
| 2,276,994 | Milinowski, Jr. | Mar. 17, 1942 |